Figure 1:
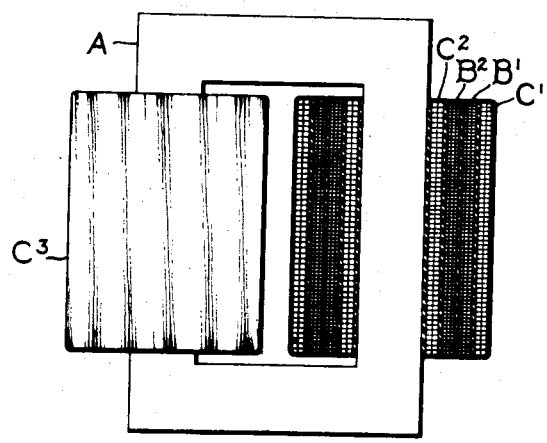

No. 873,036. PATENTED DEC. 10, 1907.
J. J. FRANK.
TRANSFORMER.
APPLICATION FILED MAY 1, 1907.

Oppositely Wound

Witnesses:

Inventor:
John J. Frank,
by Albert G. Davis
Att'y.

UNITED STATES PATENT OFFICE.

JOHN J. FRANK, OF SCHENECTADY, NEW YORK, ASSIGNOR TO GENERAL ELECTRIC COMPANY, A CORPORATION OF NEW YORK.

TRANSFORMER.

No. 873,036.　　　Specification of Letters Patent.　　　Patented Dec. 10, 1907.

Application filed May 1, 1907. Serial No. 371,284.

*To all whom it may concern:*

Be it known that I, JOHN J. FRANK, a citizen of the United States, residing at Schenectady, county of Schenectady, State of New York, have invented certain new and useful Improvements in Transformers, of which the following is a specification.

My invention relates to transformers having a plurality of sets of secondary coils on different portions of the core, and particularly to transformers designed for operation on three-wire distribution circuits.

In order to prevent the transformer regulation from being impaired by an unbalancing of the load on a three-wire distribution system, it is customary in transformers intended for use on such circuits to connect each secondary coil of one set directly in series with the secondary coil of the other set on the other portion of the core, so that a coil of each set is included between each outer wire and the neutral. In the usual construction of core-type transformers having a pair of secondary coils on each leg of the core, the connection is usually made as follows: one outer main is connected to the upper end of a secondary coil; from the lower end of this coil a connection extends across the bottom of the transformer to the lower end of a coil on the other leg; from the upper end of this second coil a connection extends across the top of the transformer to the upper end of the other coil on the first leg; and a third connection extends from the lower end of the last-mentioned coil across the bottom of the transformer to the lower end of the other coil on the second leg. It will be seen that these connections form a coil of one-and-one-half turns, carrying the full secondary current and the length of each turn of this coil in the usual construction of core-type transformers is approximately equal to the length of the core. The coil formed by these connections produces a cross-magnetization of the core and introduces a reactance into the secondary circuit, which impairs the regulation of the transformer. Furthermore, since this coil is parallel with the plane of the laminations, its flux is at right-angles to the laminations, and consequently produces eddy currents in the core, which increase the heating and lower the efficiency of the transformer.

My invention consists in so arranging the connections between the secondary coils that the circuit formed by them is substantially non-inductive. I accomplish this result by winding the two secondary coils on each leg oppositely with respect to each other, connecting one end of one coil with the corresponding end of a coil on the other leg of the core, connecting the other end of this second coil with a corresponding end of the other coil on the same leg of the core, and connecting the other end of the last-mentioned coil with the corresponding end of the other coil on the first-mentioned leg. With this arrangement only two cross-connections are employed between the secondary coils on opposite legs, and these two connections lie parallel with and adjacent to each other, so as to form a substantially non-inductive circuit.

Figure 2:
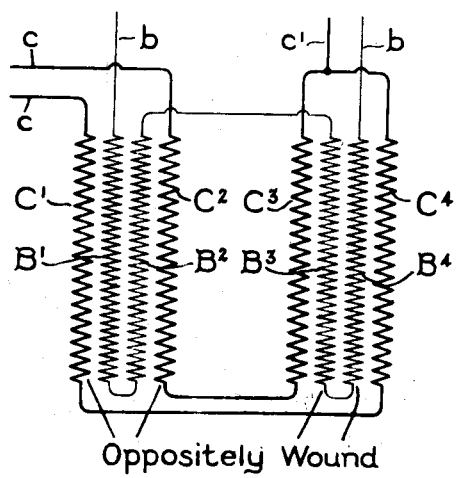

My invention will best be understood by reference to the accompanying drawings, in which Figure 1 shows, partly in cross-section, a transformer of the type to which my invention relates; and Fig. 2 shows diagrammatically the coils connected in accordance with my invention.

In the drawings, A represents the magnetic core, on each leg of which are mounted one or more primary coils $B^1$ and $B^2$, and two or more secondary coils $C^1$ $C^2$. This coil arrangement, shown in Fig. 1, is a standard arrangement, except that the two secondary coils on the core are in the present case oppositely wound, and if two primary coils are employed, as shown, these also are preferably oppositely-wound.

The connections of the several coils to each other are shown diagrammatically in Fig. 2, in which the left-hand coil of each group may be considered the outer coil on that leg of the core. *b b* represent the primary terminals. The relative connections of the primary coils are comparatively unimportant, as the primary current is comparatively small. If two oppositely-wound primary coils are placed on each leg, as indicated, the connection between the coils may be made as shown. *c c* represent the outer mains of the secondary circuit, and *c'* the connection to the neutral of a three-wire distribution system. As will be clearly seen from Fig. 2, the circuit of the secondary coils starting from one main *c*, passes through the secondary $C^1$, which is the outer coil on one leg of the core, then extends across the bottom of the transformer to the bottom of the coil $C^2$ which is the inner coil on the other leg, then from the top of this coil to the coil $C^3$ which is the outer coil on the same leg with the coil $C^4$, then across the bottom of the transformer to the bottom of coil $C^2$, which is the inner coil on the first leg. With this arrangement the secondary coil connections extend across the transformer twice, and the two cross-connections lie parallel with and adjacent to each other, and are carrying currents at any instant in opposite directions. Consequently the magnetizing effect of each cross-connection is practically neutralized by that of the other, or, in other words, the circuit formed by these connections is substantially non-inductive.

What I claim as new and desire to secure by Letters Patent of the United States, is,—

1. In a transformer, a magnetic core, a plurality of sets of secondary coils on different portions of said core, and direct series connections between each secondary coil of one set and a secondary coil on another set, said connections being arranged to form a substantially non-inductive circuit.

2. In a transformer, a magnetic core, a plurality of sets of secondary coils on different portions of said core, and conductors connecting in series secondary coils on different portions of the core, each of said conductors lying parallel with and adjacent to a second conductor carrying current in the opposite direction.

3. In a transformer, a magnetic core, a pair of oppositely-wound secondary coils on each leg of the core, a connection from one end of one of said coils to the corresponding end of a second coil on the other leg of the core, a connection from the other end of the second coil to the corresponding end of the other coil on the same leg, and a connection from the other end of the last-mentioned coil to the corresponding end of the other coil on the same leg with the first-mentioned coil.

In witness whereof, I have hereunto set my hand this 30th day of April, 1907.

JOHN J. FRANK.

Witnesses:
BENJAMIN B. HULL.
HELEN ORFORD.